United States Patent [19]
Sherman

[11] Patent Number: 5,504,681
[45] Date of Patent: Apr. 2, 1996

[54] MASS AIR FLOW SENSOR CALIBRATION

[75] Inventor: James M. Sherman, Farmington Hills, Mich.

[73] Assignee: Ford Motor Company, Dearborn, Mich.

[21] Appl. No.: 267,734

[22] Filed: Jun. 29, 1994

[51] Int. Cl.[6] .................................................. G01F 25/00
[52] U.S. Cl. ................ 364/431.03; 364/571.02; 73/3
[58] Field of Search ................... 364/431.03, 571.02, 364/431.04, 510, 431.1, 431.01, 431.05; 73/204, 31.06, 3, 118

[56] References Cited

U.S. PATENT DOCUMENTS

| | | | |
|---|---|---|---|
| 4,393,697 | 7/1983 | Sato et al. | 73/118 |
| 4,487,063 | 12/1984 | Hopper | 73/204 |
| 4,669,052 | 5/1987 | Bianco | 364/571 |
| 4,733,357 | 3/1988 | Abe | 364/431.04 |
| 4,884,215 | 11/1989 | Zboralski et al. | 364/510 |
| 4,991,424 | 2/1991 | Lehto | 73/31.06 |
| 5,012,421 | 4/1991 | Ishii | 364/431.1 |
| 5,270,935 | 12/1993 | Dudek et al. | 364/431.01 |
| 5,293,553 | 3/1994 | Dudek et al. | 364/431.04 |
| 5,390,528 | 2/1995 | Zurek et al. | 73/3 |
| 5,394,331 | 2/1995 | Dudek et al. | 364/431.05 |

*Primary Examiner*—Kevin J. Teska
*Assistant Examiner*—Russell W. Frejd
*Attorney, Agent, or Firm*—Peter Abolins; R. L. May

[57] ABSTRACT

A mass air flow sensor is calibrated by exposing it to known air flow and measuring the input and output voltage to a calibratable output stage. In the absence of air flow, the output stage is then calibrated to produce a desired output voltage in response to an application of the measured input voltage.

10 Claims, 2 Drawing Sheets

5,504,681

MASS AIR FLOW SENSOR CALIBRATION

BACKGROUND OF THE INVENTION

1. Field of the Invention

This invention relates to measuring mass air flow using a sensor.

2. Prior Art

A conventional hot wire anemometry based mass air flow sensor (MAFS) has two small temperature dependent resistive elements placed in the air flow stream. One element (called the hot element) is heated, via the use of electrical power dissipation, to a high temperature. The other element (called the cold element) is used to sense ambient air temperature. The circuit used with these elements is normally made with thick film resistors which add flexibility to the manufacturing process. These resistors may be laser trimmed to optimize the sensor function. The current through the elements is monitored through a resistor creating a voltage $V_{sig}$. Voltage $V_{sig}$ provides the input for an output section of a mass air flow sensor assembly circuit shown in FIG. 1. A voltage $V_{out}$ is at the output of the output section and coupled to output resistors $R_1$, $R_2$, $R_3$, and $R_4$.

When calibrating a mass air flow sensor it is known to trim the output resistors in order to move the transfer function relating mass air flow output voltage to the air flow being sensed (see FIG. 2). After the output resistors are trimmed, a new output voltage is measured. If the output voltage is still below the desired output voltage (corresponding to the desired transfer function) then the resistor is trimmed again and a measurement of output voltage is made again (see FIG. 3). These voltage measurements are relatively unstable because they are a function of the air flow. That is, it will take approximately about two seconds to get an average value of voltage output which can be deemed highly accurate (see FIG. 4). Because of this two second time delay after each cut to trim the resistor, the process of obtaining a final cut in the resistor trim procedure is undesirably long. It would be desirable to shorten the process of cutting the resistors which form a part of the mass air flow sensor sensing system.

In summary, due to mass air flow sensor assembly part to part variation, mass air flow sensor output stage resistors $R_1$, $R_2$, $R_3$, and $R_4$ must be laser trimmed to meet sensor transfer function requirements. A typical transfer function calibration process exposes the sensor to a low air flow and trims resistors $R_1$ and/or $R_2$ to adjust $V_{out}$ to a desired value and to provide an offset adjustment. The sensor is exposed to a high air flow while trimming resistors $R_3$ and/or $R_4$ to adjust $V_{out}$ to a high air flow desired transfer function and to provide a gain adjustment. The low air flow $V_{out}$ is then re-checked to ensure it has not shifted too much during the high air flow adjustment. If the low air flow $V_{out}$ is unacceptable both process steps must be repeated. This process is time consuming due to two reasons. First, all of the resistor trimming is performed at a time when air flow is passing through the mass air flow meter and creating $V_{sig}$. Voltage $V_{sig}$, due to the inherent dynamics of air flow, will be noisy. Therefore, to ensure accuracy lengthy measurements of $V_{out}$ must be performed during the laser trimming. Second, since adjusting the resistors at the high air flow will force the low air flow $V_{out}$ to shift, the process of going from low to high air flow laser trimming, often must be repeated, further adding to calibration process cycle time. These are some of the problems this invention overcomes.

SUMMARY OF THE INVENTION

A calibration technique in accordance with an embodiment of this invention provides an accurate method of transfer function calibration while reducing manufacturing cycle time. This results in an increase in manufacturing throughout, lowering tooling cost and reducing the size of the production area. Calibration cycle time is reduced by over 50%.

A process in accordance with an embodiment of this invention takes an initial transfer function relating mass air flow meter output voltage and air flow and determines what change is necessary to change the initial transfer function to a desired transfer function. This is done by measuring the output voltage at a low air flow and a high air flow. Each measurement takes some time (e.g. two seconds) to allow for obtaining an average output voltage in the presence of a fluctuating air flow. A desired mass air flow output voltage is determined at the low air flow and the high air flow. A mass air flow sensor signal voltage is used as an input voltage to an output stage of the mass air flow meter. Such signal voltages corresponding to the output voltage at low air flow and the output voltage at high air flow are also measured. The mass air flow output stage includes resistors which can be trimmed to adjust voltage gain and offset. A voltage source is then set to a measured signal voltage magnitude and applied to the output stage. The resistors of the output stage are then trimmed to produce a desired output voltage corresponding to the desired transfer function. Thus trimming is done in response to a stable input voltage which does not vary in response to air flow fluctuations, and the trimming can be concluded quickly.

Without this invention, the dynamics of air flow and laser trimming of resistors can make calibration of the mass air flow meter to be quite tedious. To achieve accurate results as the output approaches its target value very small laser cuts must be followed by long averaging measurements. The above described method of the invention separates the measurement of air flow and the laser trimming of resistors to achieve greater speed and accuracy.

DETAILED DESCRIPTION OF THE INVENTION

Figure 1:
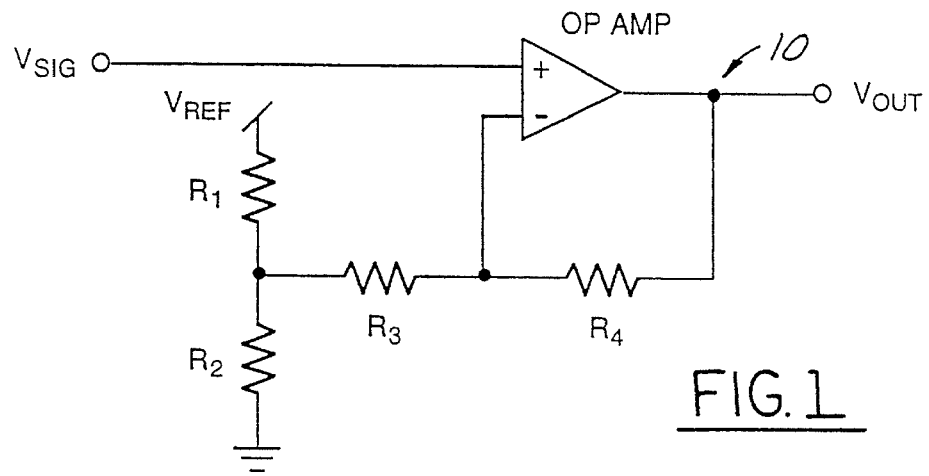
FIG. 1 is a schematic drawing of an output stage circuit for a mass air flow meter.
Figure 2:
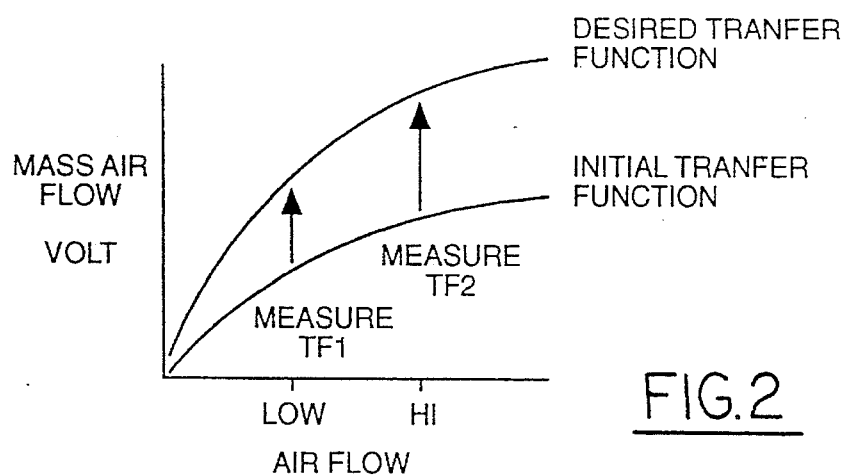
FIG. 2 is a graphical representation of mass air flow sensor output voltage versus air flow magnitude in accordance with an embodiment of this invention.
Figure 3:
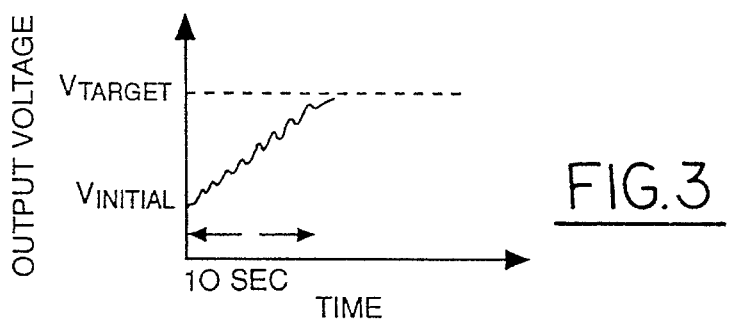
FIG. 3 is a graphical representation of output voltage versus time during laser resistor trimming in accordance with the prior art.
Figure 4:
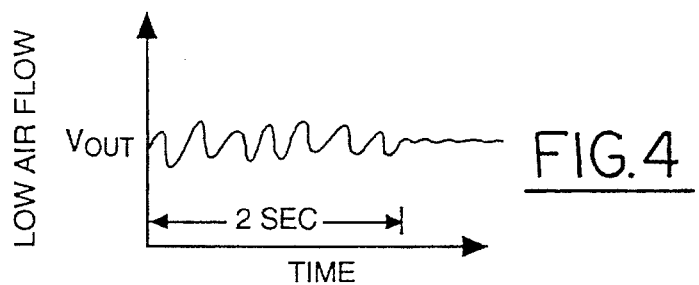
FIG. 4 is a graphical representation of output voltage versus time showing voltage fluctuations during air flow in accordance with an embodiment of this invention.
Figure 5:
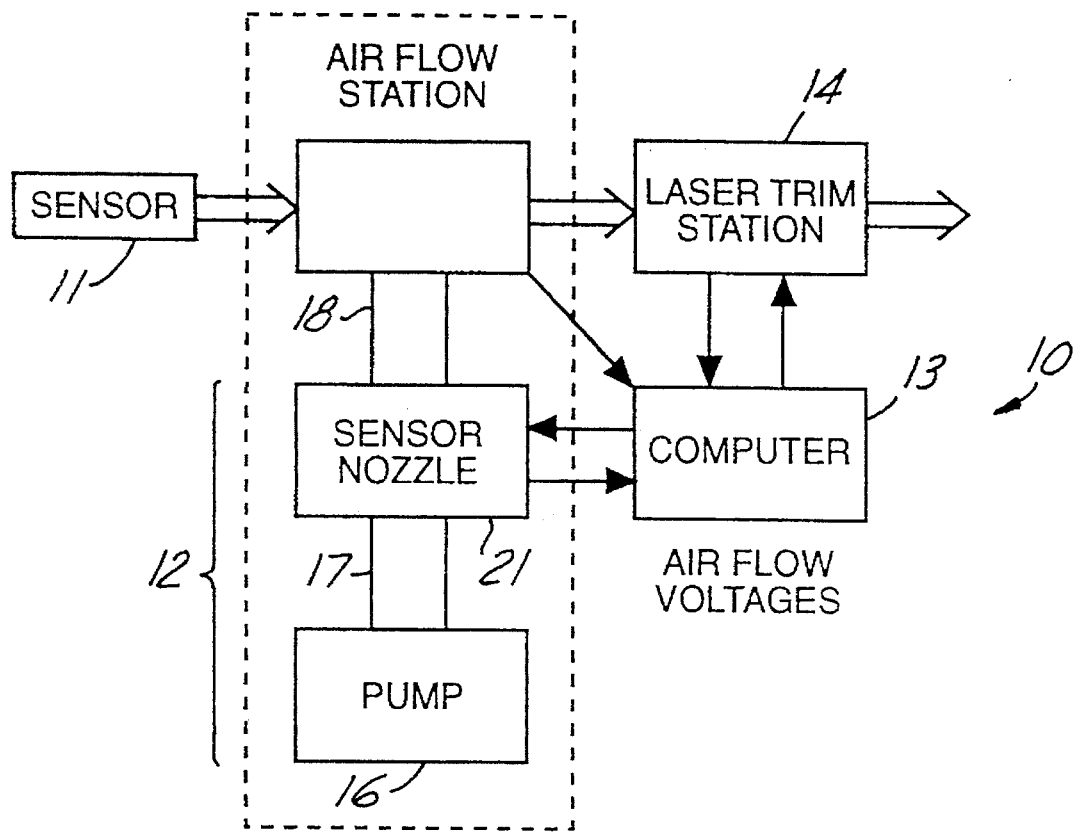
FIG. 5 is a block diagram of a mass air flow sensor production line with resistor trimming in accordance with an embodiment of this invention.

Referring to FIG. 5, a production line test system 10 for a mass air flow sensor includes a sensor carrier 11 for carrying a mass air flow sensor to a calibration station 12. Calibration station 12 includes an air flow system for providing a known quantity of air flow. Typically, a variety of output flow nozzles 21 provide a precisely known air flow. An air flow pump 16 is coupled through an air flow path 17 to mass air flow sonic nozzles 21 and through an air flow path 18 to the mass air flow sensor to be tested. When this known quantity of air flow is provided, the output stage of a mass air flow sensor on carrier 11 provides a signal to a computer 13 indicating the known quantity of air flow. If the output voltage from the mass air flow sensor is not a desired value, the output voltage can be changed by laser trimming the output resistors of the output stage of the mass air flow sensor being tested.

To accomplish this trimming of the resistors, computer 13 receives a signal from flow station 12 indicating the amount of air flow. Computer 13 also receives a signal from the mass air flow sensor indicating the signal voltage of the mass air flow sensor and the output signal of the output stage mass air flow sensor. If this output signal does not indicate a desired voltage in response to the air flow being provided by calibration station 12, a laser trimmer 14 is used to trim the output resistors $R_1$, $R_2$, $R_3$, and $R_4$ of the output stage of the mass air flow sensor to adjust the output voltage signal to the desired value. No air flow is required during trimming and carrier 11 is moved out of calibration station 12.

A calibration process in accordance with an embodiment of this invention includes the following three steps:

1. Set air flow to low flow measure $V_{out}$ and record as $V_{out1}$ measure $V_{sig}$ and record as $V_{lo}$ 2. Set air flow to high flow measure $V_{out}$ and record as $V_{out2}$ measure $V_{sig}$ and record as $V_{hi}$ 3. Let:

$Vout_{hi} \Rightarrow$ Desired $V_{out}$ at high flow $Vout_{lo} \Rightarrow$ Desired $V_{out}$ at low flow $$G_i = \frac{R_4}{R_3 + \frac{(R_1)(R_2)}{(R_1 + R_2)}}$$

$R_1$, $R_2$, $R_3$, $R_4$ are at their known pre-trim values, and $G_i$ is initial system gain a) Calculate:

$Vspan = Vout_{hi} - Vout_{lo}$ $Vspan_I = Vout_2 - Vout_1$ $$G_f = \frac{(1.0 + G_i) \cdot Vspan}{Vspan_I} - 1.0,$$

where $G_f$ is final system gain $$\Delta V_{out} = \frac{(G_f - G_i)(Vout_1 - V_{10})}{G_i}$$

Using a computer controlled precision power supply, $V_{hi}$ is injected into the circuit at $V_{sig}$.

b) Laser trim resistors $R_3$ and/or $R_4$ such that:

$V_{out} = V_{out1} + V_{span} + \Delta V_{out}$ c) Laser trim resistors $R_1$ and/or $R_2$ such that:

$V_{out} = V_{outhi}$

Since a precision power supply requires a settling time period, it is desirable to trim both gain resistors ($R_3$ and $R_4$) and the offset resistors ($R_1$ and $R_2$) while injecting only one voltage. By performing the calculation in above step (3) the desired $Vou_t$ for the gain trim in step (3b) can be determined. Finally the offset resistors ($R_1$ and $R_2$) may be trimmed in step (3c). The offset resistor valves are much smaller than the gain resistors and therefore do not effect the gain trim.

Various modifications and variations will no doubt occur to those skilled in the arts to which this invention pertains. Such variations which basically rely on the teachings through which this disclosure has advanced the art are properly considered within the scope of this invention.

What is claimed:

1. A method of calibrating a mass air flow sensor having a calibratable output stage including the steps of:

passing an air flow stream through the mass air flow sensor;

measuring stabilized corresponding input and output voltages of the output stage of the mass air flow sensor;

determining a desired output voltage of the output stage corresponding to the measured input voltage;

coupling the measured input voltage to the output stage; and calibrating the output stage to produce the desired output voltage in response to the coupled measured input voltage.

2. A method as recited in claim 1 wherein the step of calibrating the output stage includes the step of:

trimming resistors in the output stage.

3. A method as recited in claim 2 wherein the step of determining a desired output voltage includes:

establishing a low air flow;

measuring an input and an output voltage of the output stage at the low air flow;

establishing a high air flow; and measuring an input and an output voltage of the output stage at the high air flow.

4. A method as recited in claim 3 further comprising the step of:

calculating a desired gain of the output stage to achieve the desired output voltage in response to the measured input voltage.

5. A method of calibrating a mass air flow sensor having a calibratable output stage with resistors $R_1$, $R_2$, $R_3$, $R_4$ including the steps of:

setting air flow to the mass air flow sensor to a low flow;

measuring an output voltage of the output stage $V_{out}$ and recording as $V_{out1}$;

measuring an input voltage of the output stage $V_{sig}$, and recording as $V_{lo}$;

setting air flow to a high flow;

measuring $V_{out}$ and recording as $V_{out2}$;

measuring $V_{sig}$ and recording as $V_{hi}$;

setting a $Vout_{hi}$ to be equal to a desired $V_{out}$ at high air flow;

setting a $Vout_{hi}$ to be equal to a desired $V_{out}$ at low air flow;

calculating an initial system $G_i$ by $$G_i = \frac{R_4}{R_3 + \frac{(R_1)(R_2)}{(R_1 + R_2)}}$$

wherein $R_1$, $R_2$, $R_3$ and $R_4$ are at their known pre-trim values, calculating a $Vspan = Vout_{hi} - Vout_{lo}$ and a $Vspan_I = Vout_2 - Vout_1$;

calculating a final system gain $G_f$ by $$G_f = \left( \frac{(1.0 + G_i)(V\text{span})}{V\text{span}_I} \right) - 1.0,$$

$$\text{calculating a } \Delta V_{out} = \frac{(G_f - G_i)(V\text{out}_1 - V_{10})}{G_i}$$

coupling $V_{hi}$ into the output stage at $V_{sig}$;

laser trimming resistors $R_3$ and/or $R_4$ gain such that:

$$V_{out} = V_{out1} + V\text{span} + \Delta V_{out}$$

and laser trimming resistors $R_1$ and/or $R_2$ such that:

$$V_{out} = V_{outhi}$$

6. An apparatus for calibrating a mass air flow meter having a calibratable output stage including:

means for passing an air flow stream through the mass air flow sensor;

means for measuring stabilized corresponding input and output voltages of the output stage of the mass air flow sensor;

means for determining a desired output voltage of the output stage corresponding to the measured input voltage;

means for applying the measured input voltage to the output stage; and means for calibrating the output stage to produce the desired output voltage in response to the applied measured input voltage.

7. An apparatus as recited in claim 6 wherein the means for calibrating the output stage includes:

means for trimming resistors in the output stage.

8. An apparatus as recited in claim 7 wherein the means for determining a desired output voltage includes:

means for establishing a low air flow;

means for measuring an input and an output voltage of the output stage at the low air flow;

means for establishing a high air flow; and means for measuring an input and an output voltage of the output stage at the high air flow.

9. An apparatus as recited in claim 8 further comprising:

means for calculating the desired gain of the output stage to achieve the desired output voltage in response to the measured input voltage.

10. An apparatus for calibrating a mass air flow sensor as recited in claim 6 having a calibratable output stage with resistors $R_1$, $R_2$, $R_3$, $R_4$ including:

means for setting air flow to the mass air flow sensor to a low flow;

means for measuring an output voltage of the output stage $V_{out}$, and recording as $V_{out1}$;

means for measuring an input voltage of the output stage $V_{sig}$, and recording as $V_{lo}$;

means for setting air flow to a high flow;

means for measuring $V_{out}$ and recording as $V_{out2}$;

means for measuring $V_{sig}$ and recording as $V_{hi}$;

means for setting a $\text{Vout}_{hi}$ to be equal to a desired $V_{out}$ at high air flow;

means for setting a $\text{Vout}_{lo}$ to be equal to a desired $V_{out}$ at low air flow;

means for calculating an initial system gain $G_i$ by $$G_i = \frac{R_4}{R_3 + \frac{(R_1)(R_2)}{(R_1 + R_2)}}$$

wherein $R_1$, $R_2$, $R_3$ and $R_4$ are at their known pre-trim values, means for calculating a $V\text{span} = V\text{Out}_{hi} - \text{Vout}_{lo}$ and a $V\text{span}_I = V\text{out}_2 - V_{out1}$ means for calculating a final system gain $G_f$ by $$G_f = \left( \frac{(1.0 + G_i)(V\text{span})}{V\text{span}_I} \right) - 1.0,$$

$$\text{means for calculating } \Delta V_{out} = \frac{(G_f - G_i)(V\text{out}_1 - V_{10})}{G_i}$$

means for coupling $V_{hi}$ into the output stage at $V_{sig}$.

means for laser trimming resistors $R_3$ and/or $R_4$ such that:

$$V_{out} = V_{out1} + V\text{span} + \Delta V_{out}$$

and means for laser trimming resistors $R_1$ and/or $R_2$ such that:

$$V_{out} = V_{outhi}$$

* * * * *